Patented Apr. 29, 1924.

1,492,034

UNITED STATES PATENT OFFICE.

CHARLES B. JACOBS, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF EFFECTING CHEMICAL REACTIONS WITH BY-PRODUCT CARBON FROM CELLULOSE PURIFICATION.

No Drawing. Application filed July 10, 1919, Serial 309,920. Renewed September 29, 1923.

*To all whom it may concern:*

Be it known that I, CHARLES B. JACOBS, a citizen of the United States, and a resident of Wilmington, in the county of New Castle and State of Delaware, have invented a certain new and useful Process of Effecting Chemical Reactions with By-Product Carbon from Cellulose Purification, of which the following is a specification.

This invention relates to processes involving thermochemical reactions in which the element carbon is an active constituent of the reacting materials, by virtue of its power to combine chemically, under the proper conditions, with other elements to form either volatile, or non-volatile chemical compounds, and pertains especially to processes of this character in which the carbon constituting one of the reacting materials is particularly adapted for such reactions by reason of its purity and chemical activity.

In carrying out thermo-chemical reactions in general in which carbon is one of the active elements involved, it is always desirable to select a form of carbon as free from non-volatile or mineral impurities as practicable.

There is a wide variation in the chemical activity of the different varieties of amorphous carbon, the harder and denser varieties being much less active than the soft and more porous varieties.

In a general sense purity and chemical activity are closely related in the amorphous varieties of carbon; the purer the carbon used the greater is the speed and yield of the reaction as well as the purity of the product.

In such operations as the reduction of iron and various metals from their ores by carbon, the presence of certain non-volatile or mineral impurities such as silica, alumina, lime, etc., is more or less unimportant since these impurities are made to pass off in the slag and exert no deleterious effect upon the quality of the product, and for such operations relatively cheap forms of carbon, such as anthracite coal or coke from bituminous coal, constitute suitable forms of carbon for the purpose.

In the thermo-chemical treatment of alkali and alkaline-earth compounds with carbon, on the other hand, the presence of such impurities as silica, alumina, sulphur, phosphorus, iron, etc., in coal or coke not only detracts from the actual yield of the operation by forming undesirable side products with the alkali and alkline-earth compounds, but frequently results in the contamination of the finished product with impurities difficult or impossible to remove.

The reduction of zinc oxide to metallic zinc and the manufacture of certain grades of ultramarine, where the presence of even small quantities of iron prevents the production of the proper color in the finished material, are further instances of thermochemical operations in which the use of pure carbon is desirable.

Unfortunately, in many thermo-chemical operations of which the above cited examples serve as general illustrations, the use of the purer and more active varieties of carbon, such as charcoals from various woods and nut shells, petroleum coke, and cokes from the distillation residues of tars, bitumens, and pitches, which are practically free from non-volatile mineral impurities, is prohibited by the cost or inadequate supply of these forms of carbon.

In seeking a cheap and pure form of chemically active carbon to carry out my processes for producing alkali metal cyanides, in which free or elemental nitrogen is caused to combine directly with carbon and alkali metal compounds to form alkali metal cyanides as described in my applications, Serial No. 279,801 and Serial No. 279,802, filed in the U. S. Patent Office, February 28, 1919, I have discovered a form of carbon which constitutes a desideratum for thermo-chemical reactions in general, which involve carbon as a reactive element.

This material results from various vegetable fibers such as cotton, esparto, straw, wood, etc., in the process of purifying the cellulose of the fibers from the incrusting substances such as lignin, resins, and other organic substances which are soluble in caustic solution.

The principal source of this material is from the manufacture of wood pulp by the soda process where a mixture of carbon and calcium carbonate constitutes one of the waste products of the operation. Large quantities of the carbon may also be obtained in the purification of cotton and straw fibers. When derived from wood the carbon is produced in the following manner: The wood, either deciduous of coniferous, is digested with a solution of sodium hydroxide. This solution in reducing the wood to pulp combines with the incrusting substances of the wood, forming a series of soluble organic substances.

After the digestion is completed the pulp is blown into a tank equipped with a perforated bottom, and the so-called black liquor, containing the incrusting substances of the wood in solution, is drained off. The pulp is also washed with hot water, and the washings added to the original liquor. This liquor is evaporated in a vacuum evaporator until it has attained a density of 35 to 40 degrees Baumé, when it is discharged to an incinerator. The incinerator is similar to the rotary furnaces usually employed in cement manufacture, lined with firebrick and equipped with a furnace at one end. It is rotated at a speed of about one revolution per minute. The thickened liquor from the evaporator enters the incinerator at the end opposite the furnace, and is met by the hot gases and flames from the same. As it works its way toward the outlet end it is further evaporated by the hot gases and is finally ignited by the flames from the furnace. If ordinary practice were followed at this point the ash as discharged from the incinerator containing from 10 to 15% of unburned carbon, resulting from the incineration of the soluble incrusting substances of the wood contained in the evaporated liquor, would be causticized with lime, the resulting mixture leached to remove most of the sodium hydroxide formed, and the residue comprising carbon mixed with calcium carbonate thrown away.

I have discovered that if the ash from the incinerator be first leached and washed with water to remove sodium carbonate and any other soluble materials that may be present, instead of being first causticized, there is obtained as a residue a form of carbon characterized by possessing a chemical activity and power of adsorption in a remarkably high degree.

According to my process the ash is immediately conveyed from the incinerator to a leaching tank and here the soda ash formed from the caustic in the evaporation process, is dissolved and the carbon washed thoroughly with hot water. When the washing is complete there is left a residue of carbon containing usually from about 2% to 4% of $Na_2CO_3$, which is sufficiently pure for many purposes. A continuation of the washing will render the carbon substantially ash-free, except for small amounts, a fraction of a per cent, of silica and alumina.

A much larger yield of carbon may be obtained by calcining in a closed type of kiln in which case little or none of the carbon resulting from the cracking or breaking down of the resins, lignin, and alkali-soluble cellulose is consumed by oxidation.

This carbon which is described and claimed in my application, Serial No. 312,610, filed concurrently herewith, I have found to be far superior in thermo-chemical reactions to even the finest grades of charcoal, petroleum coke and similar forms of carbon of about equal purity. This is due to its greater chemical activity.

Its affinity for oxygen is so great that when it is warmed in a current of air it ignites and begins to glow at temperatures below those at which powdered charcoal is affected. The temperature is so low that a small metal crucible containing the material may be held in the bare hand without discomfort until the ignition begins.

The organic constituents of wood which are dissolved by the alkali used in the "soda process" include certain forms of cellulose which are soluble in sodium hydroxide solution, and various resins. The proportions of cellulose soluble in sodium hydroxide solution, and of resins, varies considerably in different kinds of wood. The sodium hydroxide-soluble cellulose is usually present in substantial proportions; the carbon obtained from wood in the above-described manner may therefore be said to consist essentially of alkali-soluble-cellulose carbon and alkali-soluble-wood-resin carbon.

The great affinity of this form of carbon for oxygen at temperatures below those at which the ordinary forms of carbon combine with oxygen makes it an efficient reducing agent by materially lowering the temperature ordinarily required for the reduction of various difficulty reducible oxides and may even bring certain reductions with carbon now only possible at temperatures of the electric furnace into the temperature ranges attainable in gas, oil or coal fired furnaces.

Although I have described above in detail the manufacture of carbon from the alkali-soluble constituents of wood, it is to be understood that by the expression "carbon obtainable by thermally decomposing the alkali-soluble constituents of wood," I mean to include carbon derived in like manner from cotton, esparto, straw, and equivalent vegetable fibers.

For technical purposes the material has numerous economical advantages over other forms of carbon. It is produced in a finely divided condition and requires no grinding previous to mixing with charges for thermo-chemical operations. It is a cheap waste product and can be obtained at a much lower cost than even coal or ordinary coke from bituminous coal. Its great chemical activity produces higher yields and shortens the time required for thermo-chemical operations, thus increasing the plant output of finished product.

On account of its low cost it is applicable to practically all thermo-chemical operations in which carbon is used, and its chemical activity and purity make it especially adapted to such operations as the treatment of alkali and alkaline-earth compounds, the reduction of zinc compounds, the manufacture of ultramarine, of carbon bisulphide and tetrachloride and many similar operations where purity and activity of the carbon are desirable, but heretofore have not been practicable on account of the cost of carbon substantially free from non-volatile or mineral impurities.

As will be clear from the above, my process from one aspect comprises decomposing or reducing a substance whose molecule contains oxygen, such as zinc oxide or sodium carbonate, by subjecting to a high temperature a mixture comprising said substance and alkali-soluble-cellulose carbon usually mixed with alkali-soluble-wood-resin carbon. My process also comprises effecting a reaction between a substance whose molecule contains oxygen, for example sodium carbonate, barium hydroxide or carbonate, or other oxygen-containing compound of an alkali-forming metal, and a substance whose molecule does not contain oxygen, for example nitrogen, by bringing said substances in contact with the by-product carbon of high activity hereinbefore described, maintained at a high temperature.

In the specific practical application which I have made of this form of carbon in thermo-chemical operations, viz: the production of alkali metal cyanides as described in my applications, Serial No. 279,801 and Serial No. 279,802 filed in the U. S. Patent Office, February 28, 1919, in which the following equation expresses the generally accepted empirical reaction involved:

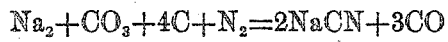

it will be seen that the carbon in the reaction forms both a volatile and a non-volatile chemical compound and that in this case it is desirable to have the activity of the carbon greater than that possessed by ordinary carbon.

This process of producing alkali-metal cyanides, stated generically, comprises heating in contact with nitrogen a mixture containing an alkali-metal halide, a reducible compound of a carbide- or nitride-forming metal such as iron, a compound of an alkali-metal other than a halide as for example an alkali-metal carbonate or hydroxide, and alkali-soluble-cellulose carbon, to a temperature sufficient to effect a reaction between the carbon, nitrogen, and the alkali-metal carbonate or hydroxide, to form an alkali-metal cyanide. A high yield may be obtained even if the iron oxide be omitted, but the yield is less than where iron oxide is used.

Typical examples of processes of making metal cyanides involving the application of this highly reactive carbon are as follows:—

*Example 1.*—Where sodium chloride or fluoride is to be the chief accelerating agent, a suitable retort is charged with a mixture of approximately thirty-nine per cent (39%) of sodium carbonate, twenty-one per cent (21%) of sodium chloride and forty per cent (40%) of carbon produced as hereinbefore described, so that the retort will be about two-thirds full. The retort is then placed in a furnace and connected with a source of nitrogen. The charge is then heated to a temperature between 800 and 970° C., any volatile matter or gaseous reduction products being allowed to escape so that a porous mixture remains in the retort. As soon as a temperature between 800 and 970° C. has been reached the nitrogen is allowed to flow through the charge in the retort, the valve connections being so adjusted that an absolute pressure of about two atmospheres is obtained inside the retort. A satisfactory yield is obtained when working under ordinary atmospheric pressure, but the yield is increased somewhat by using an increased pressure. In view of the high temperature it is not practicable to exceed an absolute pressure of about 35 pounds. The operation is continued for a predetermined time until gas samples taken from the gas escaping from the retort show little or no carbon monoxide, which indicates that the reaction is finished. In case producer gas is a source of nitrogen the gas samples show a decided fall-off of carbon monoxide with a corresponding increase in nitrogen when the reaction approaches completion. The nitrogen is then shut off and the retort sealed, removed from the furnace, and cooled to room temperature; the contents may then be removed without danger of injurious oxidation.

*Example 2.*—When iron oxide is used in conjunction with sodium chloride or fluoride as the chief accelerating agent the charge is made up of forty per cent (40%) of sodium carbonate, forty per cent (40%) of the highly reactive carbon described above, fifteen per cent (15%) of oxide of iron, and five per cent (5%) of sodium fluoride. These proportions may vary considerably; thus with 40% of sodium carbonate and about 35 to 40 parts of carbon, for example, I may use as little as three (3) parts of sodium fluoride and nine (9) parts of iron oxide; I consider it preferable, however, with the above mentioned parts of carbonate and carbon to use greater amounts of halide and iron oxide, such as from five to twelve (5–12) parts of sodium fluoride, and from thirty-five to fifteen (35–15) parts of iron oxide.

The charge made up as above described is placed in a suitable retort and subjected to the same treatment as that described in Example 1, the temperature being maintained preferably at from 925 to 950° C., under an absolute pressure of about 23 to 30 pounds.

When carrying out the processes described in the above examples with charges of identical composition except that 40% by weight of by-product carbon from the wood pulp manufacture, was substituted for 40% by weight of the ordinary carbon previously used, from 95 to 98% of the sodium carbonate present in the charge was converted into sodium cyanide in two hours, as compared with from 75 to 85% conversion of sodium carbonate to sodium cyanide in four hours with the other forms of carbon, the operations being carried out under otherwise identical conditions.

The advantages and improvement in the art attained in materially increasing the yields and shortening the time required for the completion of the reaction to one-half of that usually required, by the substitution of this particular form of carbon will be obvious to those familiar with the art.

I have found the application of this form of carbon to thermo-chemical operations differing in many ways from those mentioned above to be advantageous; thus I may form it into briquettes with various other materials to carry out various thermo-chemical reactions; or I may make compositions of it with various inert materials to obtain an extended reaction surface of carbon for use as a catalyzer, as for instance in the manufacture of phosgene, or to carry out thermo-chemical reactions in which gases or vapors or liquids are required to be brought into contact with large surface areas of chemically active carbon.

Having thus described my invention what I claim is:

1. The process of decomposing an oxygen-containing metal compound which comprises subjecting to a high temperature a mixture containing said metal compound and alkali-soluble-cellulose carbon.

2. The process of decomposing an oxygen-containing metal compound which comprises subjecting to a high temperature with exclusion of gaseous oxygen a mixture containing said metal compound and alkali-soluble-cellulose carbon.

3. The process of separating oxygen from a substance containing chemically bound oxygen which comprises heating said substance to a high temperature in contact with alkali-soluble cellulose carbon.

4. The process of separating oxygen from a substance containing chemically bound oxygen which comprises heating said substance to a high temperature in contact with carbon obtainable by thermally decomposing the alkali-soluble constituents of wood.

5. The process of effecting reactions between a substance whose molecule contains oxygen and a substance whose molecule does not contain oxygen which comprises bringing said substances in contact with alkali-soluble cellulose carbon at a high temperature.

6. The process of effecting reactions between nitrogen and an oxygen-containing compound of an alkali-forming metal which comprises bringing nitrogen in contact with a mixture comprising said oxygen-containing alkali-forming metal compound and alkali-soluble cellulose carbon while maintaining said mixture at a high temperature.

7. The process of effecting reactions between nitrogen and an oxygen-containing compound of an alkali-forming metal which comprises bringing nitrogen in contact with a mixture comprising said oxygen containing alkali-forming metal compound, an alkali-metal halide, and alkali-soluble cellulose carbon while maintaining said mixture at a high temperature.

8. The process of effecting reactions between nitrogen and an alkali-metal carbonate which comprises bringing nitrogen in contact with a mixture comprising said alkali-metal carbonate, an alkali-metal halide, and alkali-soluble-cellulose carbon while maintaining said mixture at a high temperature.

9. The process of effecting reactions between nitrogen and an alkali-metal carbonate which comprises bringing nitrogen in contact with a mixture comprising said alkali-metal carbonate, an alkali-metal halide, and carbon obtainable by thermally decomposing the alkali-soluble constituents of wood, while maintaining said mixture at a high temperature.

10. The process of effecting reactions between nitrogen and an oxygen-containing compound of an alkali-forming metal which comprises bringing nitrogen in contact with a mixture comprising said oxygen containing alkali-forming metal compound, a finely divided substance comprising iron, an alkali-metal halide, and alkali-soluble-cellulose carbon while maintaining said mixture at a high temperature.

11. The process of producing an alkali-metal cyanide which comprises heating in contact with nitrogen a mixture containing an alkali-metal halide, a reducible compound of a carbide-forming metal, a compound of an alkali-metal other than a halide, and alkali-soluble cellulose carbon, to a temperature sufficient to effect a reaction between the carbon, nitrogen, and the last mentioned alkali-metal compound to form an alkali-metal cyanide.

12. The process of making sodium cyanide which comprises heating in contact with nitrogen a mixture containing a sodium halide, iron oxide, sodium carbonate, and alkali-soluble cellulose carbon, to a temperature sufficient to effect a reaction between the carbon, nitrogen, and the sodium carbonate to form sodium cyanide.

13. The process of producing an alkali-metal cyanide which comprises heating in contact with nitrogen a mixture containing an alkali-metal halide, a reducible compound of a carbide-forming metal, a compound of an alkali-metal other than a halide, and carbon obtainable by thermally decomposing the alkali-soluble constituents of wood, to a temperature sufficient to effect a reaction between the carbon, nitrogen, and the last mentioned alkali-metal compound to form an alkali-metal cyanide.

14. The process of making sodium cyanide, which comprises heating in contact with a nitrogen-bearing gas a mixture containing sodium fluoride, a reducible compound of a carbide-forming metal, sodium carbonate, and carbon obtainable by thermally decomposing the alkali-soluble constituents of wood, to a temperature sufficient to effect a reaction between the nitrogen, carbon and sodium carbonate to form sodium cyanide.

15. The process of making an alkali-metal cyanide, which comprises heating in contact with a nitrogen-bearing gas a mixture containing an alkali-metal halide, a finely divided substance comprising iron, a compound of an alkali-metal other than a halide, and carbon obtainable by thermally decomposing the alkali-soluble constituents of wood, to a temperature sufficient to effect a reaction between the carbon, nitrogen and the alkali-metal compound to form an alkali-metal cyanide.

16. The process of making an alkali-metal cyanide, which comprises making a mixture containing an alkali-metal halide, a reducible compound of a carbide-forming metal, a compound of an alkali-metal other than a halide, and carbon obtainable by thermally decomposing the alkali-soluble constituents of wood, heating the mixture in a closed retort provided with an exit for the escape of gaseous products to a sufficient temperature to expel gaseous reduction products from the reducible compound of the carbide-forming metal to render the mixture porous, and subjecting the porous mixture to the action of nitrogen, at a temperature sufficient to effect a reaction between the carbon, nitrogen and the alkali-metal compound to form an alkali-metal cyanide.

17. The process of making an alkali-metal cyanide, which comprises making a mixture of an alkali-metal halide, oxide of iron, a compound of an alkali-metal other than a halide, and carbon obtainable by thermally decomposing the alkali-soluble constituents of wood, heating the mixture in a closed retort provided with an exit for the escape of gaseous products to a sufficient temperature to expel gaseous reduction products from the oxide of iron to render the mixture porous, and subjecting the porous mixture to the action of a nitrogen-bearing gas, at a temperature sufficient to effect a reaction between the carbon, nitrogen and the alkali-metal compound to form an alkali-metal cyanide.

18. The process of making an alkali-metal cyanide, which comprises making a mixture of an alkali-metal halide, a reducible compound of a carbide-forming metal, a compound of an alkali-metal other than a halide, and carbon obtainable by thermally decomposing the alkali-soluble constituents of wood, heating the mixture in a closed retort provided with an exit for the escape of gaseous products to a temperature of from about 850 to 950° C., and subjecting the heated mixture to the action of nitrogen, substantially as described.

19. The process of making an alkali-metal cyanide, which comprises passing nitrogen gas under an absolute pressure of from about 23 to 35 pounds per square inch in contact with a mixture containing an alkali-metal halide, a reducible compound of a carbide-forming metal, a compound of an alkali-metal other than a halide, and carbon obtainable by thermally decomposing the alkali-soluble constituents of wood, while maintaining said mixture at a temperature sufficient to effect a reaction between the carbon, nitrogen and alkali-metal compound to form an alkali-metal cyanide.

20. The process of making an alkali-metal cyanide which comprises heating in contact with nitrogen a mixture containing from 5 to 12 parts of an alkali-metal halide, from 35 to 15 parts of iron oxide, about 40 parts of an alkali-metal compound other than a halide and from 35 to 45 parts of carbon obtainable by thermally decomposing the alkali-soluble constituents of wood, to a temperature sufficient to effect a reaction between the carbon, nitrogen and the alkali-metal compound to form an alkali-metal cyanide.

In testimony whereof I affix my signature.

CHARLES B. JACOBS.